J. SEREDIUK.
AUTOMOBILE WHEEL TREAD.
APPLICATION FILED MAR. 2, 1920.

1,346,262. Patented July 13, 1920.

Inventor
J. Serediuk

By R. Morgan Elliott
Attorney

UNITED STATES PATENT OFFICE.

JOHN SEREDIUK, OF WINNIPEG, MANITOBA, CANADA.

AUTOMOBILE-WHEEL TREAD.

1,346,262.    Specification of Letters Patent.    Patented July 13, 1920.

Application filed March 2, 1920. Serial No. 362,687.

*To all whom it may concern:*

Be it known that I, JOHN SEREDIUK, a citizen of Ukraine, residing at Winnipeg, in the Province of Manitoba and Dominion of Canada, have invented certain new and useful Improvements in Automobile-Wheel Treads, of which the following is a specification.

The primary object of the present invention is the provision of a removable block tread for automobile tires adapted for ready attachment thereto providing a traction surface of great strength and durability possessing non-skid qualities.

A further object of the invention is the provision of a non-skid tread for vehicle tires adapted for receiving the entire weight of the load upon the articulated members of the device, the structure being easy and inexpensive to manufacture and quick and easy to mount upon and remove from a vehicle tire.

With these general objects in view and others that will appear as the nature of the invention is better understood, the same consists in the novel construction, combination and arrangement of parts hereinafter more fully described, illustrated in the accompanying drawing and then claimed.

Figure 1:
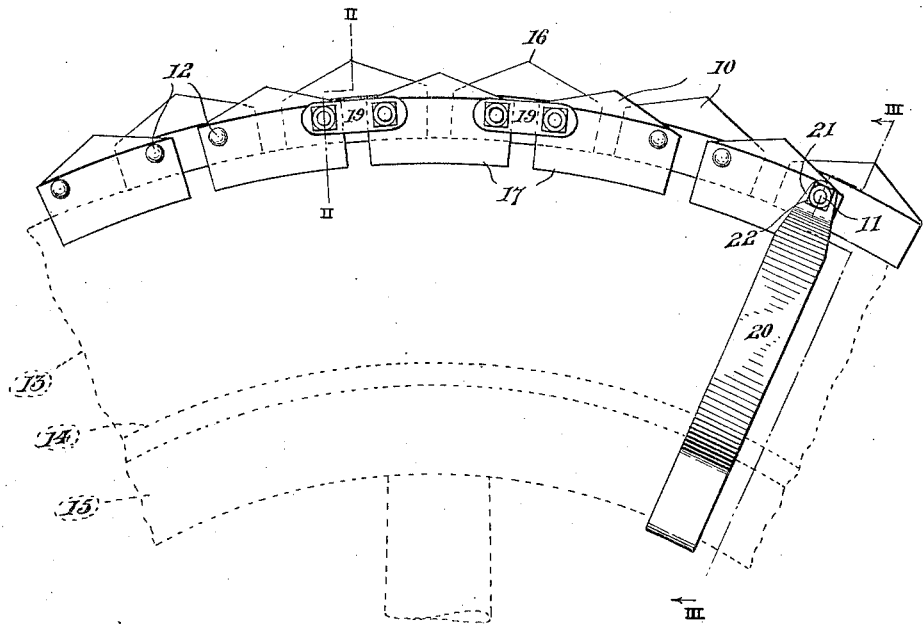
Figure 2:
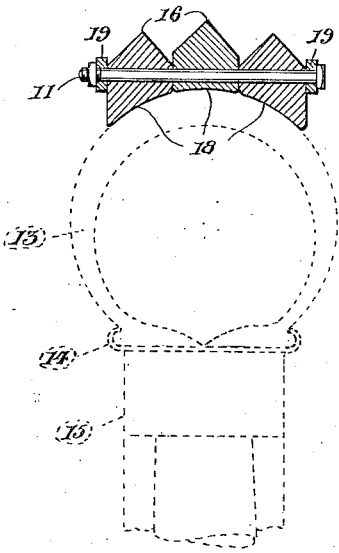
Figure 3:
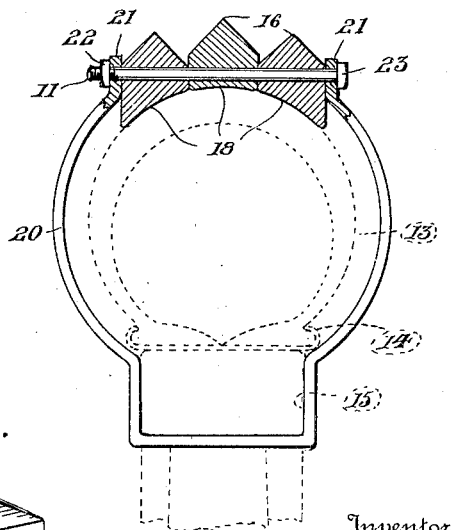
Figure 4:
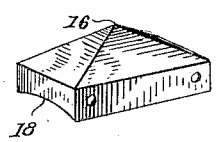

In the drawing forming a part of this application and in which like designating characters refer to corresponding parts throughout the several views, Figure 1 is an elevational view of a portion of the invention illustrated in position upon a vehicle wheel the latter being shown by dotted lines, Figs. 2 and 3 are radial sectional views taken upon lines II—II and III—III respectively of Fig. 1, and Fig. 4 is a perspective view of one of the tread blocks.

Referring more in detail to the drawing my invention broadly consists of a plurality of similar blocks 10 connected together in staggered relations by means of transverse connectors such as bolts 11 and rivets 12, the blocks being adapted for seating upon the tread portion of a tire such as indicated at 13, by dotted lines in Fig. 1, said tire being carried by a rim 14, upon a felly 15.

Each of the blocks 10 has a pyramidal outer face 16, and a rectangular base 17, the base of each block having a curved bottom or face 18, substantially conforming to the curvature of the tire 13, when the device is mounted upon the tread portion thereof. The blocks 10 are preferably arranged in three rows circumferentially of the tire 13, with the rows of blocks pivotally connected together by the rivets 12, heretofore noted.

Transverse bolts 11 however are employed at intervals instead of the rivets 12, such bolts being removable for convenience in separating the blocks while placing the device upon or removing the same from the tire. Strengthening links 19 may also be employed between bolts 11 positioned through adjacent ones of said blocks 10 and by employing the removable bolts 11 for a number of blocks, one block of each row may be entirely removed for shortening the length of the device for accommodating the same upon a smaller tire when desired.

With the device positioned upon the tread of the tire 13, as herein illustrated in the drawing, and the tire suitably inflated, the device will be maintained in its operative position upon the wheel. A securing means however in the form of a strap 20, may be employed surrounding the tire 13, rim 14, and felly 15 with the perforated free ends 21 of the strap having one of the bolts 11 secured therethrough, it being understood that each bolt is provided with a threaded nut 22 at one end thereof and a head 23 at its opposite end. The blocks 10 will support the entire weight of the load when positioned for use upon the tire, it being apparent that the pointed outer faces 16 of the blocks 10 engage the roadway increasing the traction properties of the wheel as well as preventing side slipping or sliding of the vehicle during travel. The blocks 10 may be made of any suitable material such as wood, metal or rubber depending upon the nature of the roadbed where the invention is to be used.

While the form of the invention herein shown and described is believed to be the preferable embodiment thereof, it may be understood that minor changes may be made therein without departing from the spirit and scope of the invention as claimed.

What I claim as new and desire to secure by Letters Patent is:—

1. A tread member comprising blocks arranged in adjacent rows, the blocks being positioned in staggered relations and having pyramidal outer faces adapted for engaging the roadbed when in use, the inner faces of the blocks being curved adapted for mounting upon the tread portion of a vehicle tire, pivotal connections between the blocks of each row, some of said connections being removable during the placing of the device upon and removal of the same from the vehicle tire.

2. A tread member comprising three rows of pointed blocks adapted for circumferential positioning upon the tread of a tire, pivotal connections between the blocks of the inner row and the adjacent blocks of the outer rows, removable connecting bolts transversely of the device through the outer and inner blocks and connecting links upon the bolts outwardly of the opposite side blocks of the device.

3. A tread member comprising three circumferential rows of pointed blocks arranged in staggered relations, transverse rivets secured through the blocks of the intermediate row and the adjacent blocks of each side row, whereby two opposite side blocks are pivotally connected between each adjacent pair of blocks in the middle row.

4. A tread member comprising three circumferential rows of pointed blocks arranged in staggered relations, transverse rivets secured through the blocks of the intermediate row and the adjacent blocks of each side row, whereby two opposite side blocks are pivotally connected between each adjacent pair of blocks in the middle row, removable bolts pivotally connecting the blocks of each row at one point upon the device, links at the sides of the device connecting the adjacent pairs of said bolts together and a strap attached to one of the pivotal connections for the blocks adapted for surrounding the tire rim and felly of a wheel when the device is mounted thereon.

In testimony whereof I affix my signature.

JOHN SEREDIUK.